United States Patent
Hoste (10) Patent No.: US 11,674,899 B2
(45) Date of Patent: Jun. 13, 2023

(54) PHOTONIC INTERFEROMETER BASED SENSING

(71) Applicant: Antelope Dx BV, Zwijnaarde (BE)

(72) Inventor: Jan-Willem Hoste, Gentbrugge (BE)

(73) Assignee: MEEP BV, Gentbrugge (BE)

( * ) Notice: Subject to any disclaimer, the term of this patent is extended or adjusted under 35 U.S.C. 154(b) by 67 days.

(21) Appl. No.: 16/641,017

(22) PCT Filed: Sep. 1, 2018

(86) PCT No.: PCT/EP2018/073552
§ 371 (c)(1),
(2) Date: Feb. 21, 2020

(87) PCT Pub. No.: WO2019/043207
PCT Pub. Date: Mar. 7, 2019

(65) Prior Publication Data
US 2020/0386681 A1    Dec. 10, 2020

(30) Foreign Application Priority Data
Sep. 1, 2017   (EP) ..................................... 17189018

(51) Int. Cl.
*G01N 21/45*    (2006.01)
*G01N 21/77*    (2006.01)
(Continued)

(52) U.S. Cl.
CPC ......... *G01N 21/45* (2013.01); *G01N 21/7703* (2013.01); *G01N 2021/7709* (2013.01);
(Continued)

(58) Field of Classification Search
CPC ............... G01N 21/45; G01N 21/7703; G01N 2021/7709; G01N 2021/7736;
(Continued)

(56) References Cited

U.S. PATENT DOCUMENTS 9,151,968 B2 * 10/2015 Klein Koerkamp .. G02F 1/0147
2004/0239944 A1 * 12/2004 Shirai ..................... G01N 21/05
356/481

(Continued)

FOREIGN PATENT DOCUMENTS

EP    2214049 A1    8/2010

OTHER PUBLICATIONS

Misiakos et al., "Broad-band Mach-Zehnder interferometers as high performance refractive index sensors: Theory and monolithic implementation", 2014, Optics Express, 22, 8, p. 8856-8870. (Year: 2014).*

(Continued)

*Primary Examiner* — Samuel P Siefke
*Assistant Examiner* — Henry H Nguyen
(74) *Attorney, Agent, or Firm* — Workman Nydegger

(57) ABSTRACT

A sensing system for characterizing analytes of interest in a sample comprises a photonic integrated circuit with an integrated interferometer. The integrated interferometer is configured for spectroscopic operation. The integrated interferometer comprises at least a sensing arm and a reference arm, both the sensing arm and the reference arm having an exposable segment available for interaction with the sample, whereby the exposable segment of the reference arm has an optical path length which is smaller than twice the optical path length of the exposable segment of the sensing arm. The exposable section of the sensing arm is selective to the analyte of interest, whereas the exposable section of the reference arm is not selective to the analyte of interest.

9 Claims, 5 Drawing Sheets

Classic (spectroscopic) Mach-Zehnder

Hybrid Mach-Zehnder (51) Int. Cl.
*G02B 6/293* (2006.01)
*G02B 6/12* (2006.01)

(52) U.S. Cl.
CPC ............... *G01N 2021/7736* (2013.01); *G01N 2021/7779* (2013.01); *G01N 2201/06113* (2013.01); *G01N 2201/08* (2013.01); *G02B 6/29352* (2013.01); *G02B 2006/12159* (2013.01)

(58) Field of Classification Search
CPC . G01N 2021/7779; G01N 2201/06113; G01N 2201/08; G01N 2021/7793; G02B 6/29352; G02B 2006/12159
See application file for complete search history.

(56) References Cited

U.S. PATENT DOCUMENTS

| | | | |
|---|---|---|---|
| 2004/0257579 A1 | 12/2004 | Shirai et al. | |
| 2011/0102804 A1 | 5/2011 | Lipson et al. | |
| 2012/0214707 A1 | 8/2012 | Ymeti et al. | |
| 2013/0071061 A1* | 3/2013 | Tu | G01N 21/41 385/12 |
| 2014/0176957 A1 | 6/2014 | Bienstman et al. | |
| 2016/0265898 A1 | 9/2016 | Schreuder et al. | |

OTHER PUBLICATIONS

Brosinger et al., "A Label-Free Affinity Sensor with Compensation of Unspecific Protein Interaction by a Highly Sensitive Integrated Optical Mach-Zehnder Interferometer on Silicon," Sensors and Actuators B, vol. 44, Jul. 8, 1997, pp. 350-355.

Heideman et al., "Remote Opto-chemical Sensing with Extreme Sensitivity: Design, Fabrication and Performance of a Pigtailed Integrated Optical Phase-Modulated Mach-Zehnder Interferometer System," Sensors and Actuators B, vol. 61, Aug. 6, 1999, pp. 100-127.

Kitsara et al., "Integrated Optical Frequency-Resolved Mach-Zehnder Interferometers for Label-Free Affinity Sensing," Optics Express, vol. 18, No. 8, Apr. 12, 2010, 14 Pages.

Iqbal et al., "Label-Free Biosensor Arrays Based on Silicon Ring Resonators and High-Speed Optical Scanning Instrumentation," IEEE Journal of Selected Topics in Quantum Electronics, vol. 16, No. 3, May/Jun. 2010, pp. 654-661.

European Search Report from EP Application No. EP17189018, dated Feb. 28, 2018.

International Search Report & Written Opinion from PCT Application No. PCT/EP2018/073552, dated Oct. 19, 2018.

* cited by examiner

PHOTONIC INTERFEROMETER BASED SENSING

FIELD OF THE INVENTION

The invention relates to the field of sensors. More specifically it relates to a system and method for sensing of analytes of interest based on specific binding events using a photonic, spectroscopic, interferometer for allowing high quality analysis.

BACKGROUND OF THE INVENTION

Label-free refractive index sensors designed for sensing purposes are inherently non-specific. Anything that changes the refractive index in the near vicinity of the sensor contributes to the signal. In order to make the sensor specific for a biomolecule such as a protein, the sensor is typically coated with a biochemical layer which only binds to the protein which needs to be detected. However, the refractive index can still change locally due to a change of fluid, change of temperature, a-specific binding, physical adsorption, strain, pressure, ionic loading of the surface, etc. This makes the use of these sensors challenging in an uncontrolled point-of-care environment, prone to changing environmental conditions and varying compositions of patient samples.

One of the most-used self-tests for consumers is a pregnancy test. A major reason of its success is the ease-of-use: no manipulation is required except applying the sample. However, only lateral flow immunoassays such as a pregnancy test make this single-step use possible (dirty assay). Other more performant testing methods such as those used in clinical labs and in doctor's offices typically require several manipulation steps to perform the assay. In order to design a sensor system which is easy to use by non-trained personnel, as is the case in a consumer or a point-of-care setting, the number of manipulations has to be reduced to a minimum and the cost has to be several orders of magnitude lower than the professional systems. Ideally, a measurement can be done by just applying the sample without the need for applying different fluids or mixing the sample with reagents. This causes a problem for label-free sensors. Since these sensors respond to many different phenomena, they usually require a three-step protocol: first a baseline measurement with certain environmental conditions or with a certain liquid on top of the sensor, followed by flowing of the user sample and binding of the biomolecules to the sensor, and finally a return to the initial environmental conditions or a flow with the same liquid as the baseline measurement. This is necessary because it has to be guaranteed that a signal response can be allocated to the presence of the biomolecules, hence the environmental factors have to be kept constant as much as possible. This way, the status of the sensor (i.e. the spectrum or the intensity at a certain wavelength) is measured in step 3 and 1 and the difference is allocated to a certain concentration of biomolecules. A second reason for the last step is to wash off a-specifically bound or adsorbed molecules.

A partial solution for the complexity of existing refractive index based sensing systems is suggested by Iqbal in IEEE J. Sel. Top. Quantum Electron. (2010) 654-661 by omitting the last washing step, reducing the number of fluidic steps from three to two. This is done by measuring the rate of change of the spectrum when the fluid switches from a buffer fluid to a buffer fluid containing the analyte. Nevertheless, this still requires a two-step process and only works in a lab environment when spiking a known fluid with an analyte, which can't be translated to a real-life situation of flowing human sample with unknown composition. When using an unknown patient sample, the slope of the binding curve would be obscured by a variety of phenomena happening simultaneously. Reducing the amount of fluidic steps thus requires reducing the response of the sensor to anything but the specific binding events.

The problem of signal contributions not originating from specific binding is well-known and a known solution is to make use of a self-referencing system such as a symmetric Mach-Zehnder interferometer with monochromatic readout. The interferometer splits a wave in two or more components which each undergo a different path, before they are recombined. The difference in optical phase accumulated over the different paths is then transduced to an intensity change by a change in the interference pattern. The Mach-Zehnder interferometer thereby is particularly interesting for integrated photonics and low-cost sensing since it splits a waveguide in two arms and recombines the two waveguides to a single waveguide again which is coupled out of the chip. The interaction of the to-be-detected analytes with the Mach-Zehnder is restricted to one of the arms such that a phase change in the output can be allocated to the detection of the analytes. These Mach-Zehnder interferometers are typically read out in a monochromatic way. A detailed characterization thereof is done by Heideman and Lambeck in Sensors Actuators B Chem. (1999) 100-127. The configuration is a symmetric interferometer with two equal arm lengths. The high degree of symmetry has the advantage that any signal contribution which is present in both arms is not transduced to the intensity of the output. The authors state that the system has reduced sensitivity to e.g. temperature variations. Brosinger in Sensors Actuators B Chem. (1997) 350-355 shows a reduced sensitivity to a-specific adsorption when opening up both arms but only attaching specific probes to one of the arms. Although providing good referencing capabilities, these symmetric monochromatic Mach-Zehnders suffer from severe drawbacks such as sensitivity fading: the sensitivity of this system drops significantly if the starting phase is not carefully controlled, making these hardly usable in practical sensing situations. A modulation scheme is proposed by Heideman and Lambeck in Sensors Actuators B Chem. (1999) 100-127, which involves electro-optical control over the phase of both arms which greatly increases the cost of a consumable hosting these sensors.

The problem of a-specific binding and the occurrence of physical adsorption is usually dealt with by means of advanced biochemistry. Biochemical probes (such as antibodies or aptamers) are made in a very specific way such that other biomolecules do not bind to them. Second, the surface is often treated with an antifouling or blocking agent preventing a-specific binding as well as physical adsorption.

In a typical bio-experiment with a refractive index sensor a baseline is set by flowing a buffer solution, followed by flowing the sample containing the analytes. The sensor generates a signal simultaneously coming from the binding of analytes to the surface, as well as from the change in fluid itself, which has a different refractive index. The latter is a bulk effect, while the former is a surface effect. This is a common and inherent problem with refractive index sensors. A solution has been offered with microring or plasmonic resonators where two polarizations are injected in the sensor at once. The different response of the two modes in the resonator can be disentangled to a response coming from the bulk index and the binding. This is however a computationally intensive method using a high degree of linearization which needs an extensive calibration protocol. This limits the accuracy and the use in a single flow setting. Other approaches use two sensors where one sensor is a reference for bulk fluids towards the other. This increases the footprint however.

Based on the above, there still is a need for a high accuracy self-test which is easy to perform.

SUMMARY OF THE INVENTION

It is an object of embodiments of the present invention to provide a good photonic interferometer based sensing method and system.

It is an advantage of embodiments of the present invention that photonic interferometer based sensing methods and systems allowing detection of specific binding events such that they can be used for high quality self-testing.

It is an advantage of embodiments of the present invention that the methods and systems provided allow to drastically reduce the signal components coming from anything else than a specific binding event, without changing the mode of operation of the sensor or reducing the sensitivity to specific binding events. This causes an improvement of the limit of detection and specificity of the sensor.

It is an advantage of embodiments of the present invention that the methods and systems provided allow accurate detection of specific binding by reducing signals from a-specific binding or physical adsorption using a solution based on the underlying physics and photonics. It is an advantage of embodiments of the present invention that signals are not generated when a-specific binding or physical adsorption occurs. The solution provided is not based on the biochemical level positioned at the top of the sensor, since a-specific binding or physical adsorption is not necessarily prevented.

It is an advantage of embodiments of the present invention that methods and systems can be provided that are not sensitive to temperature induced changes. It is an advantage of at least some embodiments of the present invention that suppression of temperature sensitivity can be obtained by adjusting the photonic components such that a-thermal operation is achieved. It is an advantage of at least some embodiments of the present invention that a-thermal operation can be combined with suppression of many other components not stemming from specific bindings, while operation is still possible in a regime allowing low cost sensing.

It is an advantage of at least some embodiments of the present invention that the sensor substantially only responds to the specific binding of the analytes to the sensor.

It is an advantage of at least some embodiments of the present invention that all other signals contributing are suppressed as much as possible.

It is an advantage of embodiments of the present invention that methods and systems are provided that allow to measure the presence of biomolecules by only applying the patient sample, omitting the need for a baseline and a washing fluid. This significantly reduces the complexity and the cost of the system and paves the way to bring lab-quality analysis to consumers.

It is an advantage of embodiments of the present invention that it combines the advantages of a balanced operation of a symmetric monochromatic Mach-Zehnder with the ease of use and stable point of operation of a spectroscopic asymmetric Mach-Zehnder.

It is an advantage of embodiments of the present invention that unlike a monochromatic Mach-Zehnder, there are no active components necessary to achieve a read out which is independent of the particular starting phase of the Mach-Zehnder. Therefore, it is an advantage of embodiments of the present invention that there is no need for tracking the change in phase for a single wavelength, but rather that the shift of the whole spectrum is evaluated. This makes the system insensitive to the starting phase and hence the sensor can exist out of purely passive components, making the consumable that is hosting the sensor very affordable. Furthermore the system performs an averaging over many wavelengths, beneficial for the detection limit.

In some embodiments the detector and/or the source are not integrated and the chip as such is a consumable operationally connectable to the detector and/or the source. The detector and/or the source then will be part of the read out instrument. The consumable then is a passive device and the read out instrument is an active unit. Alternatively the detector and/or the source can be integrated on the chip and form part of the consumable.

It is an advantage of embodiments of the present invention that referencing can be performed both for temperature, for a-specific adsorption, for physical adsorption and for fluid-specific phenomena such as e.g. change of bulk refractive index, swelling of the organic layer or ionic charging.

It is an advantage of embodiments of the present invention that an easy to use system and method is obtained for characterizing analytes in a sample. It is an advantage of embodiments of the present invention that no extra fluidic or calibration steps are required, resulting in an easy system for use, as well as that no computational methods are required for referencing, since the referencing is performed in the photonic domain.

It is an advantage of embodiments of the present invention that a sensing system with a small footprint can be obtained. The latter assists in obtaining a less expensive consumable. Also the read-out protocol is easy; since the referencing is performed in the photonic domain.

In a first aspect, the present invention relates to a sensing system for characterizing analytes of interest in a sample, the sensing system comprising a photonic integrated circuit comprising an integrated interferometer configured for spectroscopic operation, the integrated interferometer comprising at least a sensing arm and a reference arm, both the sensing arm and the reference arm having an exposable segment available for interaction with the sample, whereby the exposable segment of the reference arm has an optical path length which is smaller than twice the optical path length of the exposable segment of the sensing arm, wherein the exposable section of the sensing arm is selective to the analyte of interest, whereas the exposable section of the reference arm is not selective to the analyte of interest.

The exposable section of the sensing arm may be modified to contain active probes for being selective to the analyte of interest. The active probes may be selective to the analyte of interest. The exposable section of the sensing arm may be biochemically modified.

The interferometer being configured for spectroscopic operation may comprise the interferometer being connectable or connected to a broadband radiation source or being connectable or connected to a variable wavelength radiation source, varying its wavelength over time. The interferometer being configured for spectroscopic operation may correspond with a system whereby a combination of the radiation source and the detector allow for spectrally resolving wavelengths during a same measurement.

At least one of the reference arm or the sensing arm may comprise a covered segment not interacting with the sample when the interferometer is in use. In some embodiments, both the reference arm and the sensing arm comprise a covered segment.

It is an advantage of embodiments of the present invention that the sensing system is based on a Mach-Zehnder interferometer having reconfigured arms (with respect to the state of the art), such that it has a point of operation of an asymmetric spectroscopic Mach-Zehnder; but the referencing capabilities of a monochromatic symmetric Mach-Zehnder.

Contrary to a monochromatic version, an interferometer used in a spectroscopic way uses the spectral features, i.e. the shape of the spectrum, of the interferometer in a direct way to determine the sensing result. This establishes itself in the following two cases.

Either (1) more than one spectral output of the interferometer, e.g. more than two spectral outputs, is used where each output corresponds to a specific wavelength or wavelength band. In some embodiments, the wavelengths or the center wavelengths of the bands are not more than 100 nm apart. In some embodiments, more than one output, e.g. more than two outputs, are used to determine a spectral shift. In some embodiments, the more than one output, e.g. more than two outputs, are used to determine a spectral change of a certain section of the interferometer spectrum, where that section is spectrally broader than 2 nm, e.g. broader than 5 nm or broader than 10 nm. Such a spectral change can be for example a shift in wavelength or for example a shift of a wavelength band in intensity. In some embodiments, the more than one spectral output, e.g. more than two spectral outputs, thus may have wavelengths or the center wavelengths of the bands are not more than 100 nm apart while covering a section that is spectrally broader than 2 nm, e.g. broader than 5 nm or broader than 10 nm.

Or (2) a single, substantially broad, spectral output of the interferometer is used in a sense that it is sampled by just one, substantially broad, wavelength band. In this case, it is still required for the interferometer to have a specific spectral shape which is tailored to the system in order for this spectral change to be measured by a single, substantially broad, band. Making use of this specific spectral shape is thus coded to a single band or single output. In this sense it is still spectroscopic. Such a spectral change can be for example a shift in wavelength or for example a shift of a wavelength band in intensity. In this case the substantially broad spectral band is spectrally broader than 2 nm, e.g. broader than 5 nm or broader than 10 nm. This spectroscopic sensing is in contrary to monochromatic sensing where intensity changes are observed at a single static wavelength, without any use of or requirements on the shape of the interferometer spectrum. For an interferometer to be used advantageously in a spectroscopic way, an interferometer spectrum with sufficient spectral features in the detection bandwidth is required. As such, a spectroscopic Mach-Zehnder necessarily requires an asymmetric design: both arms need to have a difference in length. This destroys the signal referencing capabilities. The presented invention circumvents this in a way that the spectroscopic mode of operation is maintained, but the referencing capabilities of a symmetric Mach-Zehnder (as in a monochromatic system) is achieved. In essence this makes a spectroscopic Mach-Zehnder insensitive towards any signal contribution which does not come from a specific binding event, while remaining a purely passive and cheap component.

The exact length of the exposable segments may vary and making these longer increases the sensitivity of the system.

The number of arms in the interferometer may be exactly two. The number of arms may be larger than 2. The latter may allow to simultaneously probe for different analytes of interest, e.g. by using two sensing arms wherein different probes are used for the different analytes of interest.

The interferometer may be a Mach-Zehnder interferometer. Other interferometers such as the Michelson interferometer may alternatively also be used. The overall optical path length difference between the reference and the sensing arm may be obtained such that the spectral transfer function of the interferometer has a period P, the system having a spectral resolution smaller than or equal to P/2.

The sensing system may comprise a radiation system for providing broadband radiation and/or a detector for detecting broadband radiation. The detector may be adapted for detecting broadband radiation in a spectrally resolved manner.

In some embodiments, only one of the sensing arm or the reference arm may comprise a covered segment. According to some embodiments, the substantially large path difference is induced by implementing a segment covered for not interacting with the sample only in one of the arms. In the other arms, in such embodiments no covered segment is present, or formulated differently, the length of the covered segment is 0.

Both the sensing arm and the reference arm may comprise a covered segment, but the length of the covered segments may be substantially different for causing the overall optical path difference in the different arms.

The exposable segments that are exposed to the sample in the at least two arms, when the sensing system is in contact with the sample, may have the same surface treatment finishing, except for the presence of the active specific probes. More specifically either the same surface treatment finishing may be used, or a surface treatment is applied resulting in the same interaction with the sample.

It is an advantage of certain embodiments of the methods and systems that the interferometer has a spectral period which is not smaller than 0.1 nm, more comfortably not smaller than 0.5 nm, for example not smaller than 1.5 nm. Interferometers with spectral periods smaller than 0.1 or 0.5 nm will have low sensitivity to changes in the refractive index of the cladding of the sensing arm in the sense that they will lead to small spectral shifts which are difficult to resolve and require stringent requirements on spectral stability of the system. Furthermore an interferometer with such a small period would require a large path length difference leading to sensors with large footprints, which increases the cost of the sensor and reduces the amount of sensors that fit a certain space, reducing the amount of multiplexing or amount of analytes that can be analyzed during one measurement.

It is an advantage of certain embodiments of the methods and systems that the wavelengths or central wavelengths of the wavelength bands used in the spectroscopic operation are not more than 100 nm apart, i.e. that the spectrum can be sampled with samples less than 100 nm apart. For sampling of the spectrum with 100 nm spacing or larger, the interferometer would need to have a spectral period of a few 100 nm in order for it to be correctly interpreted. This large period would lead to a very small path length difference which is difficult to fabricate. Furthermore it would be difficult finding a proper radiation source that can operate this system.

It is an advantage of embodiments of the methods and systems that in the different arms the same flow conditions occur, whereby no energetic preference for a contaminant to adsorb to one arm or the other. Consequently, both arms experience the same amount of adsorption, above a certain stochastic limit.

The exposable segments may have the same surface treatment finishing, but additionally the exposable segment in the sensing arm may have specific active probes for binding. Alternatively; the exposable segments may have the same surface treatment finishing, except for the exposable segment in the sensing arm having specific active probes for binding analytes of interest and the exposable segment in the reference arm having non-specific probes or specific non-active probes.

The same surface treatment finishing may imply that the exposable segments both (all) comprise a linking layer that is the same. Alternatively, the same surface treatment finishing may imply a linking layer that is different in composition but similar in response to the sample.

It is an advantage of embodiments of the present invention that referencing can occur for any kind of surfactant, ion, protein, adsorption, binding event, conformational change or swelling phenomenon that is not caused by the active probes.

It is an advantage of embodiments according to the present invention that the referencing is based on the photonic behavior rather than on biochemical blocking, since the former results in a potential higher versatility and referencing power. Biochemical blocking features which try to impede other proteins or ions from adsorbing to the surface or from binding to a-specific binding spots on the surface depend on a probabilistic event depending on the exact chemical interaction of the adsorbent with the blocking agent and will never allow to completely block for a wide range of adsorbents.

Furthermore, the referencing based on the photonic behavior could also be used in combination with blocking agents. In case something does adsorb to the surface, despite of the appliance of blocking steps, the signal contribution will be cancelled due to the photonics based referencing.

The radiation may be guided in the photonic integrated circuit in waveguides.

The width of waveguides in the covered segments in the reference arm and the sensing arm may be substantially different and configured for a-thermal operation.

The sensing system may be a consumable adapted for being coupled to a broadband radiation detector.

The sensing system may be free from active phase control elements or referencing electronics.

The present invention also relates to a method for characterizing an analyte of interest in a sample, the method comprising bringing the sample into contact with an integrated interferometer comprising at least a sensing arm and a reference arm, the sensing arm and the reference arm having an exposable segment available for interaction with the sample, whereby the exposable segment of the reference arm has an optical path length which is smaller than twice the optical path length of the exposable segment of the sensing arm, wherein the exposable section of the sensing arm is selective to the analyte of interest, whereas the exposable section of the reference arm is not selective to the analyte of interest, allowing, if present, analytes of interest to selectively bind to active probes in the exposable segment of the sensing arm, and recording an optical interferogram in a spectroscopic way for deriving therefrom a characteristic of the sample with respect to the analytes of interest.

Bringing the sample into contact with an integrated interferometer may comprise bringing it into contact with an integrated interferometer wherein at least one of the reference arm or the sensing arm comprises a covered segment not interacting with the sample when the interferometer is in use.

The method may comprise, for sensing analytes in a sample, a single fluidic interaction step with the sensing surface being the sample being brought in direct contact with the sensing surface. It is an advantage of embodiments of the present invention that a single-step assay can be performed. It is an advantage of embodiments of the present invention that no buffer fluid baseline streaming is required but that the fluidic interaction step directly can be done with the sample of interest.

It is an advantage of embodiments of the present invention that the sensor does not respond heavily to many phenomena, each with their own time constant, such as for example to binding of analytes to the surface but also to the reconformation or swelling of the biofunctional layer on top of the sensor, to a-specific adsorption of contaminants to the sensor surface, to charging of the surface due to ions, etc.

It therefore is an advantage of embodiments of the present invention that in the absence of signal contributions of the non-relevant phenomena, good fitting to the binding curve of specific bindings to the surface can be performed.

The method may imply a direct switch from air to sample of interest (including analytes or for which it is intended to check whether and/or how much analytes are present). It is an advantage of embodiments of the present invention that the first minutes of the binding curve is not obscured by a mixture of different phenomena. After an instantaneous bulk shift coming from the huge refractive index difference between air and liquid, the method may allocate the sensor signal strictly to binding of analytes to the chip surface. This allows for a concentration determination to be done in a few minutes time.

It is an advantage of embodiments of the present invention that a single step assay can be performed with a detection limit being 3 to 9 orders of magnitude lower than lateral flow immunoassays; thus resulting in a performance level comparable to a clinical lab.

In one aspect the present invention also relates to a sensing system for characterizing analytes of interest in a sample, the sensing system comprising a photonic integrated circuit comprising an integrated interferometer comprising at least a sensing arm and a reference arm, both the sensing arm and the reference arm having an exposable segment available for interaction with the sample, whereby the exposable segment of the reference arm has an optical path length which is smaller than twice the optical path length of the exposable segment of the sensing arm. The exposable section of the sensing arm is selective to the analyte of interest, whereas the exposable section of the reference arm is not selective to the analyte of interest. At least one of the reference arm or the sensing arm comprises a covered segment not interacting with the sample when the interferometer is in use.

The present invention also relates to the use of a sensing system as described above for detecting and/or quantifying an analyte of interest in a sample.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments according to the present invention reference is made to a photonics integrated circuit (PIC), this refers to a variety of forms and material systems such as for example low-index contrast waveguide platforms (e.g. polymer waveguides, glass/silica waveguides, $Al_xGa_{1-x}As$ waveguides, $In_xGa_{1-x}As_yP_{1-y}$ waveguides), high-index contrast waveguides (e.g. Silicon-on-Insulator, semiconductor membranes), plasmonic waveguides (e.g. metal nanoparticle arrays, metal layers), also called Photonic Lightwave circuits (PLC). A photonic integrated circuit comprises at least an integrated optical interferometer, but may also comprise a plurality of other integrated components such as for example an integrated optical coupler, a taper, a tunable filter, a phase-shifter, a grating, a modulator, a detector, a source, a multiplexer, a demultiplexer or a combination thereof. The optical components can be active or passive. Typically, transport of radiation in the photonics integrated circuit is based on transport in integrated waveguides. The components can be integrated for example monolithically, heterogeneously or hybridly. Monolithical integration is the integration technology that uses a single processing flow to process the diverse components potentially using different materials, e.g. integrated germanium detectors in silicon photonics IC. Heterogeneous integration is the integration technology for which the components are processed in separate process flows, which are then integrated at die or wafer level, e.g. BCB bonding, wafer bonding, and other bonding schemes, 3D integration. Hybrid integration is the integration of components or materials on processed photonic integrated platforms, e.g. flip-chipping of detectors, bumping, gluing, wire bonding, co-packaging, etc.

The devices and methods of the present invention are further described for the particular case of an SOI (Semiconductor-on-Insulator) material system. In examples used in the present description, reference will be made to a SiN system, although embodiments are not limited thereto. The devices and methods of the present invention can be based on other material systems, such as for example, silicon-on-insulator systems, III-V material systems, metallic layers, low index contrast material systems or a combination thereof.

Where in embodiments of the present application reference is made to radiation, reference is made to electromagnetic radiation. The radiation envisaged is radiation having a suitable wavelength or wavelength range for sensing, i.e. detecting or imaging, a substance. In some embodiments radiation used will be visual or infrared radiation, e.g. near infrared radiation or mid infrared radiation, or a combination thereof, although the invention is not limited thereto. The infrared radiation that is used may be in the range 600 nm to 900 nm.

In a first aspect the present invention relates to a sensing system for characterizing analytes of interest in a sample.

The sensing system comprises a photonic integrated circuit comprising an integrated interferometer configured for spectroscopic operation. The integrated interferometer comprises at least a sensing arm and a reference arm, both the sensing arm and the reference arm having an exposable segment available for interaction with the sample, whereby the exposable segment of the reference arm has an optical path length which is smaller than twice the optical path length of the exposable segment of the sensing arm. The exposable section of the sensing arm is selective to the analyte of interest, whereas the exposable section of the reference arm is not selective to the analyte of interest.

According to embodiments of the present invention, the sensor systems are based on a reconfiguration of the arms of an interferometer, e.g. a Mach-Zehnder interferometer, such that it has a point of operation of an unbalanced spectroscopic Mach-Zehnder, but has the symmetric referencing capabilities of a monochromatic balanced Mach-Zehnder. Embodiments of the present invention, refer to an interferometer, e.g. a Mach-Zehnder interferometer, with 2 or more arms where each arm has a section which is open for interaction with the sample, and in some embodiments a section which is covered with a cladding material, blocking interaction with the sample.

As indicated above the exposable segments differ in the sense that some of the arms have active biochemical probes while the others do not. This gives rise to a system which is referenced for a multitude of microfluidic and chemical phenomena. No differential phase change will be generated for a change of bulk fluid, for a-specific binding or physical adsorption to the sensor surface not mediated by the active chemical probes, for swelling of the functional layer due to an air-liquid interface or for charging of the surface due to interaction of ions to the surface. This makes it possible to allocate the response of the sensor when a switch is made from air to sample, containing analyte and contaminants, strictly to the binding of the analytes to the sensor surface. Furthermore, it does so without adding additional active phase control elements or referencing electronics. The device remains purely passive. These are the two key elements to obtain a low-cost dirty assay, required to allow consumers to do high quality self-testing.

As indicated, the system is based on a photonic integrated circuit. The photonic integrated circuit, as indicated, comprises an integrated interferometer which receives light from a radiation source and typically guides light in the photonics integrated circuit via waveguides.

Figure 1:
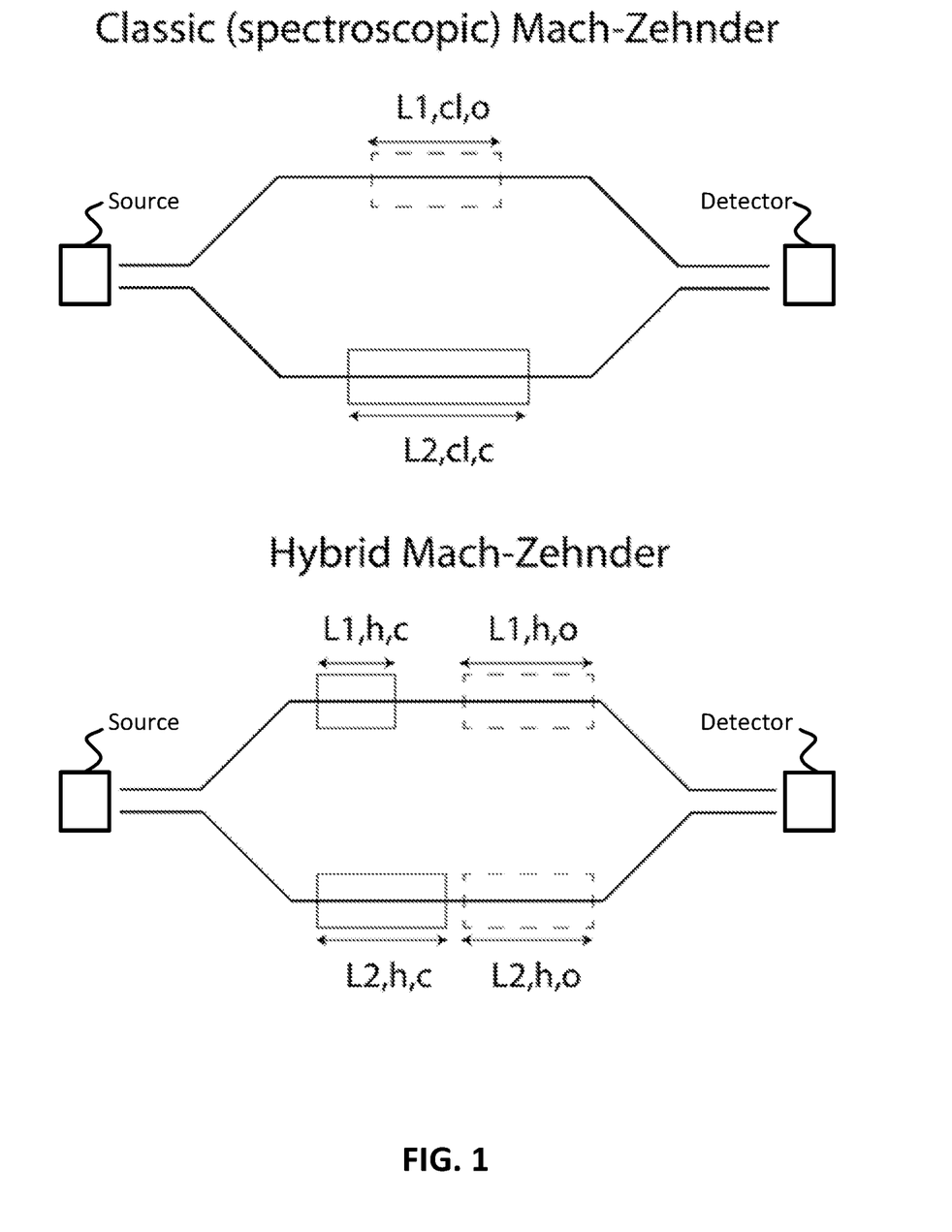
FIG. 1 illustrates a top schematic diagram showing a generalized picture of a classic (spectroscopic) Mach-Zehnder interferometer, and the bottom picture of FIG. 1 illustrates a hybrid Mach-Zehnder interferometer with two arms where each arm has both a section which is cladded (unavailable for interaction with the sample, subscript c) and a section which is opened (available for interaction with the sample, subscript o). The total length of an arm is the sum of both sections, e.g. L1=L1,o+L1c.

In FIG. 1 a generalized picture of the state-of-the-art (spectroscopic) Mach-Zehnder based on the configuration of its arms is depicted on the top (classic) and compared to a generalized picture of an embodiment of the Hybrid Mach-Zehnder presented in this invention, depicted on the bottom. The sensing arm to which the analytes-under-test can bind to is for both concepts represented by arm 1, while the reference arm, not accessible for binding of the analytes-under-test is represented by arm 2. The subscript cl refers to classic Mach-Zehnder, h refers to hybrid Mach-Zehnder, o refers to an opened segment accessible for the sample, c refers to a closed segment not accessible for the sample. For the classic Mach-Zehnder $$L1,cl=L1,cl,o$$

$$L2,cl=L2,cl,c$$

In order to obtain a spectroscopic asymmetric Mach-Zehnder, L1,cl and L2,cl are chosen sufficiently different to generate a spectral transfer with distinct spectral features in the detection bandwidth. One may chose the arms such that a transfer function with period P is obtained, while the spectral resolution is smaller than P/2. A symmetric Mach-Zehnder on the contrary has L1,cl=L2,cl. For the hybrid Mach-Zehnder $$L1,h=L1,h,o+L1,h,c$$

$$L2,h=L2,h,o+L2,h,c$$

Inserting open and closed regions in both arms allows to attain a system that has the referencing capabilities of a monochromatic symmetric Mach-Zehnder, while using the point-of-operation of an asymmetric spectroscopic Mach-Zehnder, allowing for a passive and low-cost sensor. The invention can be exemplified by creating a hybrid system with equal sensitivity as a classic spectroscopic system L1,h,o=L1,cl,o. Compared to the state-of-the-art spectroscopic Mach-Zehnder, inserting an open section in the reference arm L2,h,o<2*L1,h,o, gives rise to a system with superior referencing capabilities. The exact length of the other sections L1,h,c, L2,h,c and L2,h,o are to be set in order to generate a spectral transfer function that can be used in a spectroscopic way.

In embodiments of the present invention, the integrated interferometer has arms configured in such a way that every arm has a section which is available for interaction with an analyte. These sections are ideally of equal length, in order to have maximum referencing capabilities, but minimally the length of the open section in the reference arm should be smaller than twice the length of the open section in the sensing arm, at which point a superior cancellation of unwanted signal components coming from anything but the selective binding of the analyte-under-test is attained compared to state of the art spectroscopic Mach-Zehnders, which only have a sensing window in the sensing arm. While the open section of the sensing arm (L1,h,o) determines the sensitivity, the other sections (L1,h,c, L2,h,c and L2,h,o) are chosen such that the output spectrum of the interferometer has periodic spectral features with a period P. The system is being operated in a spectroscopic way: the spectral features, i.e. the shape of the spectrum, of the interferometer are used in a direct way to determine the sensing result. This establishes itself in the following two cases.

Either (1) more than one spectral output of the interferometer, e.g. more than two spectral outputs, is used where each output corresponds to a specific wavelength or wavelength band. In some embodiments, the wavelengths or the center wavelengths of the bands are not more than 100 nm apart. In some embodiments, more than one output, e.g. more than two outputs, are used to determine a spectral shift. In some embodiments, the more than one output, e.g. more than two outputs, are used to determine a spectral change of a certain section of the interferometer spectrum, where that section is spectrally broader than 2 nm, e.g. broader than 5 nm or broader than 10 nm. Such a spectral change can be for example a shift in wavelength or for example a shift of a wavelength band in intensity. In some embodiments, the more than one spectral output, e.g. more than two spectral outputs, thus may have wavelengths or the center wavelengths of the bands are not more than 100 nm apart while covering a section that is spectrally broader than 2 nm, e.g. broader than 5 nm or broader than 10 nm.

Or (2) a single, substantially broad, spectral output of the interferometer is used in a sense that it is sampled by just one, substantially broad, wavelength band. In this case, it is still required for the interferometer to have a specific spectral shape which is tailored to the system in order for this spectral change to be measured by a single, substantially broad, band. Making use of this specific spectral shape is thus coded to a single band or single output. In this sense it is still spectroscopic. Such a spectral change can be for example a shift in wavelength or for example a shift of a wavelength band in intensity. In this case the substantially broad spectral band is spectrally broader than 2 nm, e.g. broader than 5 nm or broader than 10 nm. This spectroscopic sensing is in contrary to monochromatic sensing where intensity changes are observed at a single static wavelength, without any use of or requirements on the shape of the interferometer spectrum. In the first case, this can be done for example (but not limited to) by using a broadband light source and a spectrum analyzing system, by using a tunable laser and a power meter, in which case the spectroscopic data of the Mach-Zehnder is obtained over the sweeping time of the laser or by using several sources with a static spectrum which are radiating towards the sensor in a sequential way in time. It is an advantage of certain embodiments that a broadband source is used to radiate towards the interferometer, at which point the extraction of the more than 1 wavelength point is being done by a spectrum analyzing system at the output of the interferometer. Broadband light sources are inexpensive and can have a wide spectral range, offering advantages in sensitivity of the interferometer. Also, no active tuning or steering is required from a broadband source, simplifying the system. Furthermore, this allows high speed data acquisition since the more than 1 wavelength points are read out in parallel. In the second case, this can be done for example (but not limited to) with a power meter and a broadband light source which overlaps spectrally with the interferometer in an advantageous way such that a spectral shift or a more general spectral change of the whole interferometer spectrum will be observed by a change in intensity. The common use of a single laser with a fixed wavelength probing a change in intensity, not requiring any specific spectral characteristics is thus not covered by this definition. The length of the closed or covered sections (L1,h,c, L2,h,c) can also be 0. Consequently, in such embodiments, no covered portions are present. As also indicated above, only one of the reference arm and the sensing arm may comprise a covered portion.

According to some embodiments of the present invention, the open section of some of the arms have been made selective to an analyte of interest. Such rendering selective may be biochemically modifying so as to contain active probes which are selective to an analyte. On the other hand, the open section of some of the arms (at least the referencing arm) do not contain active probes which are selective to an analyte. The linking layer advantageously must be deposited equally on all arms. The more controlled the linking layer and probes can be deposited on the different arms, the more effective the technique. This can be achieved by making use of nano-spotting techniques in precisely controlled conditions. These services are offered by various specialized companies and institutions and have shown to produce highly reproducible results.

According to some embodiments of the present invention, the exposable segments of the two arms are equal in optical path length.

Since the covered parts, when present according to some embodiments, may have different lengths in order to give rise to a specific spectrum, a change in temperature will induce a shift of the spectrum due to a differential phase accumulation over the arms. According to some embodiments of the present invention, the widths of the waveguide cross section of the covered parts can be tuned for rendering the system less or not dependent on temperature. This way, careful determination of all $(L_i, W_i)$ parameters, where i is a specific section of an arm of the interferometer, can give rise to a spectrum with a specific period, as well as a-thermal operation. Combining this with referencing for other phenomena according to embodiments of the present invention without the need for active components is one of the strong advantages of embodiments of the present invention. It is the combination of referencing for various phenomena in a passive low-cost way which assists in obtaining a dirty assay for consumer-use.

Figure 2:
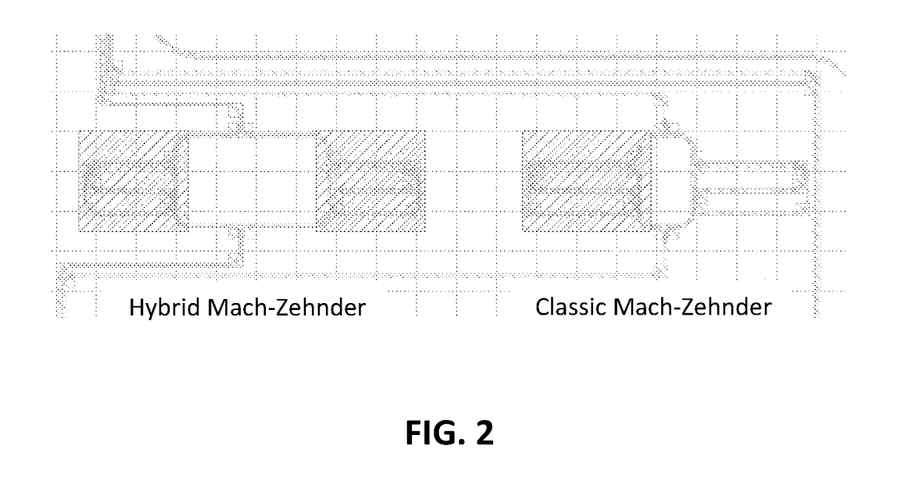
FIG. 2 illustrates a design of a hybrid Mach-Zehnder (left hand side) according to an embodiment of the present invention and a design of a classic Mach-Zehnder (right hand side) according to a state of the art system.

By way of illustration, embodiments of the present invention not being limited thereto, an example of a system according to an embodiment of the present invention is shown below. The exemplary system according to an embodiment of the present invention shows a photonic design applied to a two-arm Mach-Zehnder. In the present example, the design is made in a silicon nitride platform. The sensor provides the hybrid operation of a spectroscopic Mach-Zehnder combined with monochromatic characteristics). FIG. 2 illustrates a comparison between a conventional spectroscopic Mach-Zehnder (on the right) and a hybrid Mach-Zehnder according to the exemplary embodiment of the present invention (on the left).

In the design shown, the complete chip is covered with silicon dioxide, with windows illustrated by the green squares. According to the classic Mach-Zehnder one arm is open, while the other arm is covered. The arms have a different length to assure spectroscopic operation. The hybrid Mach-Zehnder according to the exemplary embodiment shown on the left illustrates a sensing window in both arms of equal length and a covered part in both arms of different length. For the specific example discussed, the nitride platform in which the design was made has the following vertical layers: a 2.3 um thick SiO2 box on top of a Si substrate. On top of the SiO2 box, a 220 nm thick Si3N4 waveguide layer which is patterned with lithography. The cladded regions comprise of a 30 nm AlOx layer with a 1 um SiO2 layer on top. The windowed regions have the AlOx and the SiO2 removed such that the sample can come in direct contact with the Si3N4 waveguide layers. The waveguides have a width of 700 nm, to guide light with a certain bandwidth around a central wavelength of 850 nm. The exemplary design of the hybrid Mach-Zehnder has the following lengths (L), effective refractive indices of the guided optical mode for both the cladded and the open sections (n) and the corresponding optical path lengths (n*L):

$L1,h,o$=1775 µm $L1,h,c$=315 µm $L2,h,o$=1775 µm $L2,h,c$=200 µm $n,cl$=1.607

$n,o$=1.573

$(n,o*L1,h,o)$=2792 µm $(n,cl*L1,h,cl)$=506 µm $(n,o*L2,h,o)$=2792 µm $(n,cl*L2,h,cl)$=321 µm.

Figure 3:
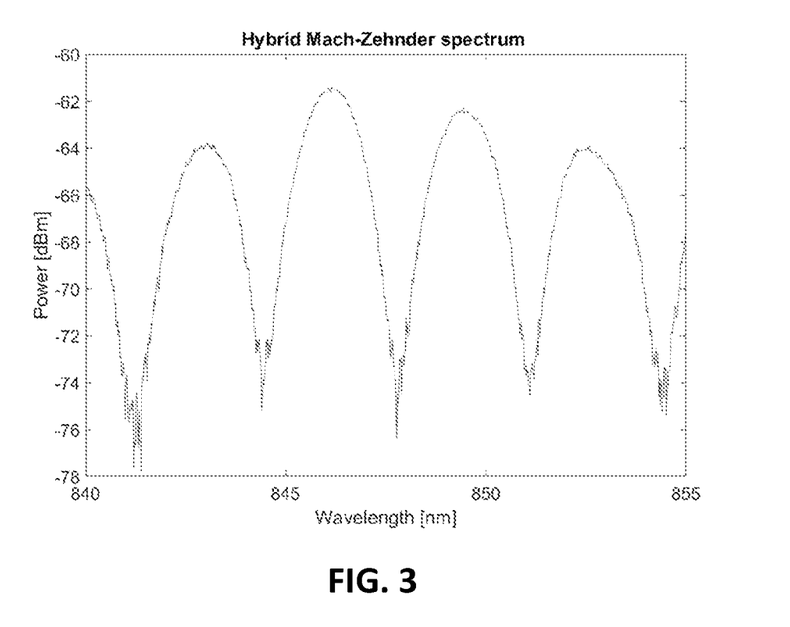
FIG. 3 illustrates a spectrum of a hybrid Mach-Zehnder system showing spectral features necessary for a spectroscopic point of operation, illustrating features and advantages of systems according to embodiments of the present invention.
Figure 4:
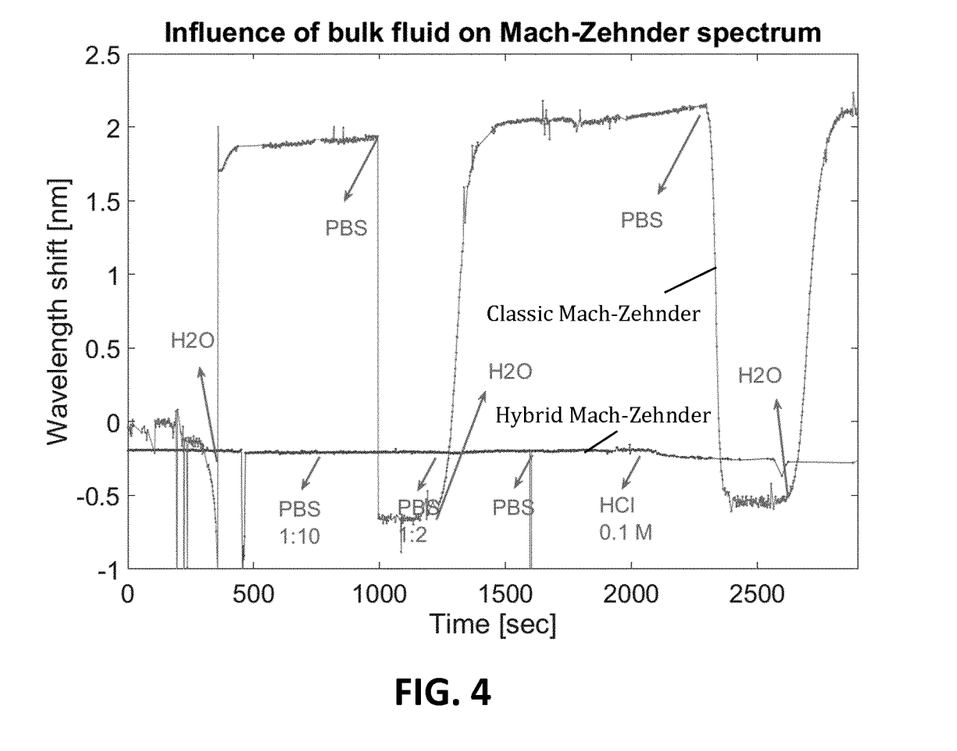
FIG. 4 illustrates that a hybrid Mach-Zehnder system shows no signal contribution from switching the buffer fluid, while the classic Mach-Zehnder system does. This shows the referencing capabilities of a hybrid Mach-Zehnder system according to an embodiment of the present invention.

This design has been fabricated and characterized. The spectrum of the Hybrid Mach-Zehnder is shown in FIG. 3 illustrating indeed the wanted periodic spectral features. To assess the sensing activity of the Mach-Zehnder, this spectrum is tracked in function of time and a spectral shift of the spectrum is correlated to a binding event of a certain analyte. To do this, a broadband SLED light source excites the optical chip, while the spectrum is obtained via an optical spectrum analyzer. The most important characteristic of a measurement in a single fluidic step is that the binding of the analytes to the surface can be isolated from the other phenomena. A bulk shift is instantaneous, while the affinity binding happens on a much larger timescale. Other phenomena such as the swelling of the functionalization layer due to a gas-liquid interface, or more general a reconformation of the linking layer do have a time constant comparable to the affinity binding. It is thus important to make sure the linking layer is present in both open arms such that this swelling is not generating a differential phase shift. FIG. 4 illustrates an experiment where a switch of the fluid from water to various other bulk fluids is made. This shows the referencing performance as a heavily reduced response from a change in bulk fluid compare to the classic Mach-Zehnder can be seen.

Figure 5:
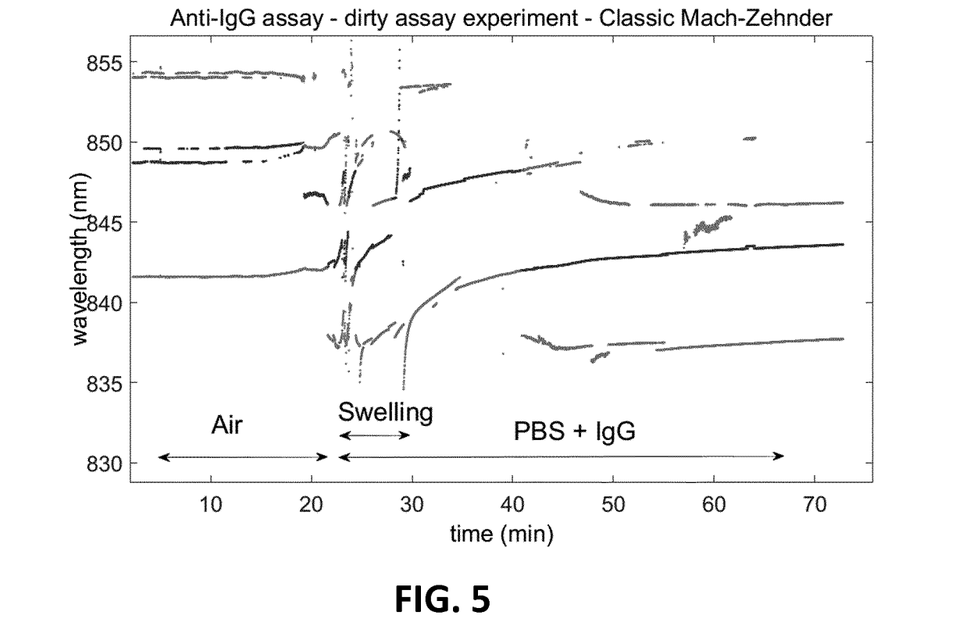
FIG. 5 illustrates a classic Mach-Zehnder system in a dirty assay experiment showing several minutes of dynamics which obscure the binding curve, illustrating disadvantage of systems according to the state of the art.

In FIG. 5 a dirty assay experiment with a classic Mach-Zehnder interferometer is shown where the sensor has been prepared with a linking layer to interface the silicon nitride surface with antibodies, more specifically copoly(DMA-NASMAPS): N,Ndimethylacrylamide, N-acryloyloxysuccinimide, and 3-(trimethoxysilyl), propyl methacrylate. On the copolymer we have grafted mouse IgG that serves as a probe to bind specifically to anti-mouse IgG. The copolymer has a thickness of 2 nm, while the antibody is approximately 10 nm in size. Switching directly from air to PBS+anti-mouse IgG shows a large transition going out of the dynamic range, signified by the several vertically aligned dots at min 22, followed by 5 minutes of relative rapid change, probably due to dynamic reconfigurations (swelling) of the biofunctional layer. This makes it impossible to measure the initial rate of change related to the concentration of analyte in the sample.

Figure 6:
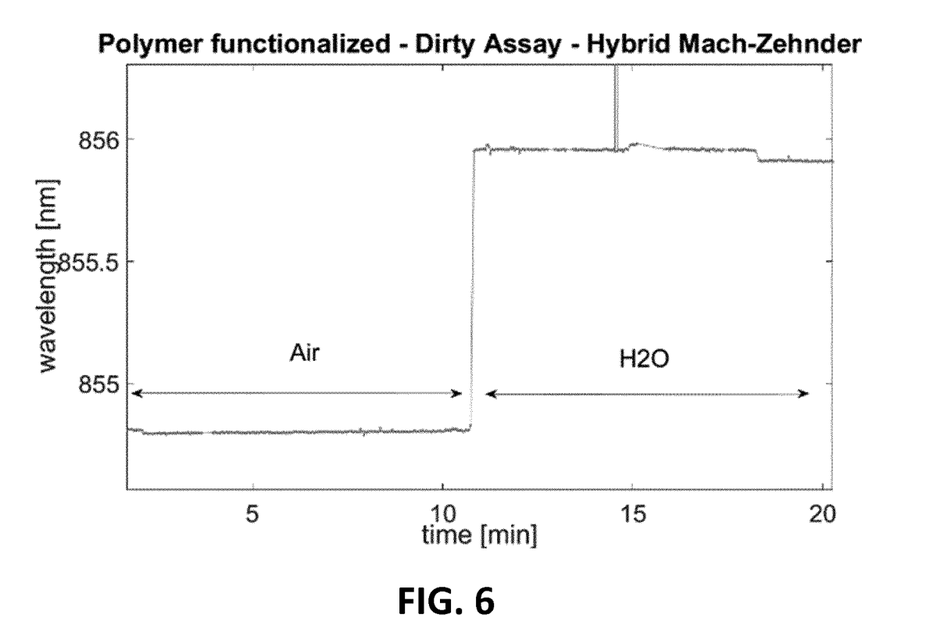
FIG. 6 illustrates a dirty assay experiment where the shift from air to water is instantaneous followed by a clean signal, as obtained in a hybrid Mach-Zehnder according to an embodiment of the present invention.

In FIG. 6 a similar experiment is shown but whereby the recording is performed with a Hybrid Mach-Zehnder according to an embodiment of the present invention. There is an instantaneous shift from air to water of much smaller amplitude (~1 nm) followed by no dynamic behaviour. This system allows to measure the initial rate of change and hence the concentration in a dirty assay fashion.

In a second aspect, the present invention relates to a method for characterizing an analyte of interest in a sample. The method comprises bringing the sample into contact with an integrated interferometer comprising at least a sensing arm and a reference arm. Both the sensing arm and the reference arm have an exposable segment available for interaction with the sample, whereby the exposable segment of the reference arm has an optical path length which is smaller than twice the optical path length of the exposable segment of the sensing arm. The exposable section of the sensing arm is selective to the analyte of interest, whereas the exposable section of the reference arm is not selective to the analyte of interest.

The method also comprises allowing, if present, analytes of interest to selectively bind to active probes in the exposable segment of the sensing arm. The method furthermore comprises recording an optical interferogram in a spectroscopic way for deriving therefrom a characteristic of the sample with respect to the analytes of interest. Further optional features of methods according to embodiments of the present invention may correspond with functionalities of features of systems according to embodiments of the first aspect. It is an advantage of embodiments of the present invention that lab-quality patient sample testing can be brought to consumers due to the reduction of the fluidic steps that are required for performing an assay. It is an advantage of embodiments of the present invention that refractive index measurements can be performed using just the sample, increasing robustness of the measurement. Separate calibration can e.g. be avoided. Systems according to embodiments of the present invention result in a high ease-of-use as well as a low-cost system.

In a third aspect, the present invention relates to the use of a sensing system according to an embodiment of the first aspect, for detecting and/or quantifying an analyte of interest in a sample.

Figure 7A:
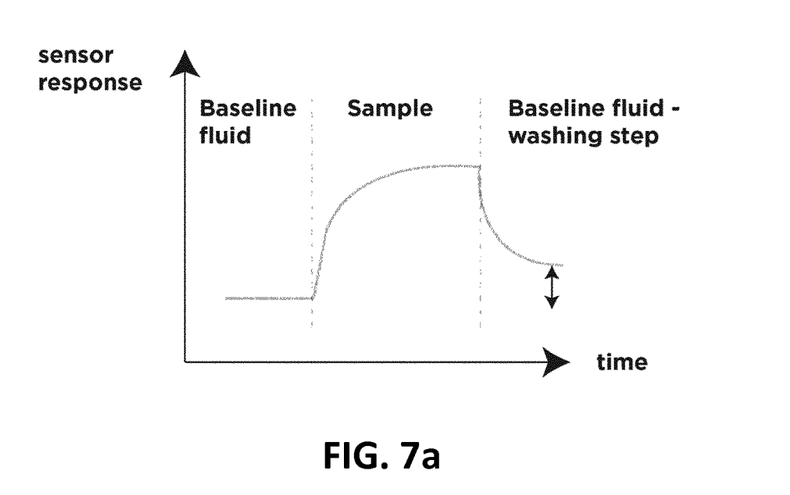
FIG. 7a and FIG. 7b illustrate the sensor responses of a state of the art sensor (FIG. 7a) and of a sensor according to embodiments of the present invention (FIG. 7b).
Figure 7B:
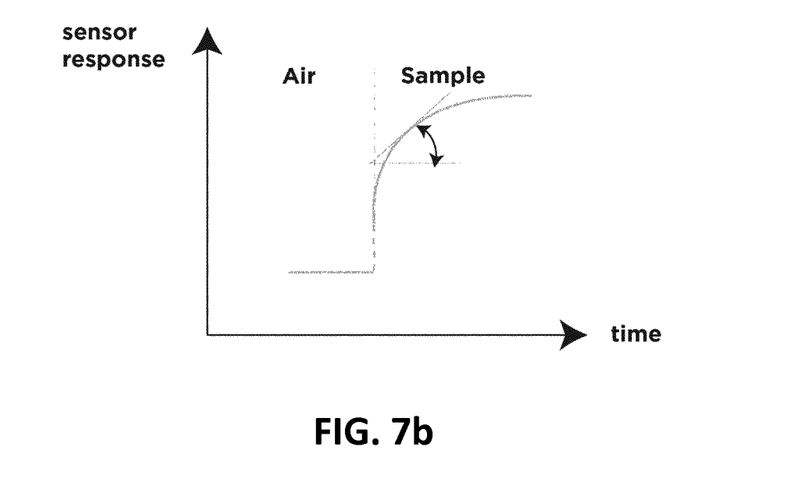

Further by way of illustration, aspects and advantages of embodiments of the present invention are discussed below. For typical refractive index sensors according to the state of the art, a fluidic sequence is used whereby first a baseline fluid measurement, thereafter a sample measurement, followed by a washing step. The necessity of two additional fluidic steps have an implication on ease-of-use due to the fact that several fluids need to be flown, on cost due to the fact that active microfluidic actuation and thus pumping devices, several fluid connections, switches, etc. are required, and on the time-to-result since the 3 fluids need to be applied and the binding curve needs to go into saturation, which typically require more than 30 minutes. The latter is illustrated in FIG. 7a. Furthermore, classic labelfree refractive index sensing also typically suffers from sensing aspecific signals coming from various origins. To get rid of those, the sample is usually pre-treated or cleaned up, which usually needs to be done by trained personnel in a lab. Embodiments of the present invention, solve at least partly the issues as raised above. The sensors are more robust to dirty samples, since they are more robust to aspecific signals. Furthermore, embodiments do not require two fluidic steps, resulting in the sensors being more suitable for self testing, since costs are reduced, ease of use is increased and the time-to-result is decreased. Embodiments of the present invention, result in the theoretical sensor response as shown in FIG. 7b. In some embodiments, measuring the slope of the binding curve accurately and relating the concentration additionally can result in measuring times being limited to a few minutes.

Embodiments of the present invention advantageously are adapted to render the air to sample switch fast and clean. Since slow processes are reduced or filtered out, e.g. swelling of the bio-layer due to wetting, such processes do not obscure the slow binding of the analyte to the sensor. Furthermore, also aspecific adsorption signals are reduced or filtered out.

The fast transition that can be obtained in embodiments of the present invention is also illustrated in FIG. 4 and FIG. 5.

Figure 8:
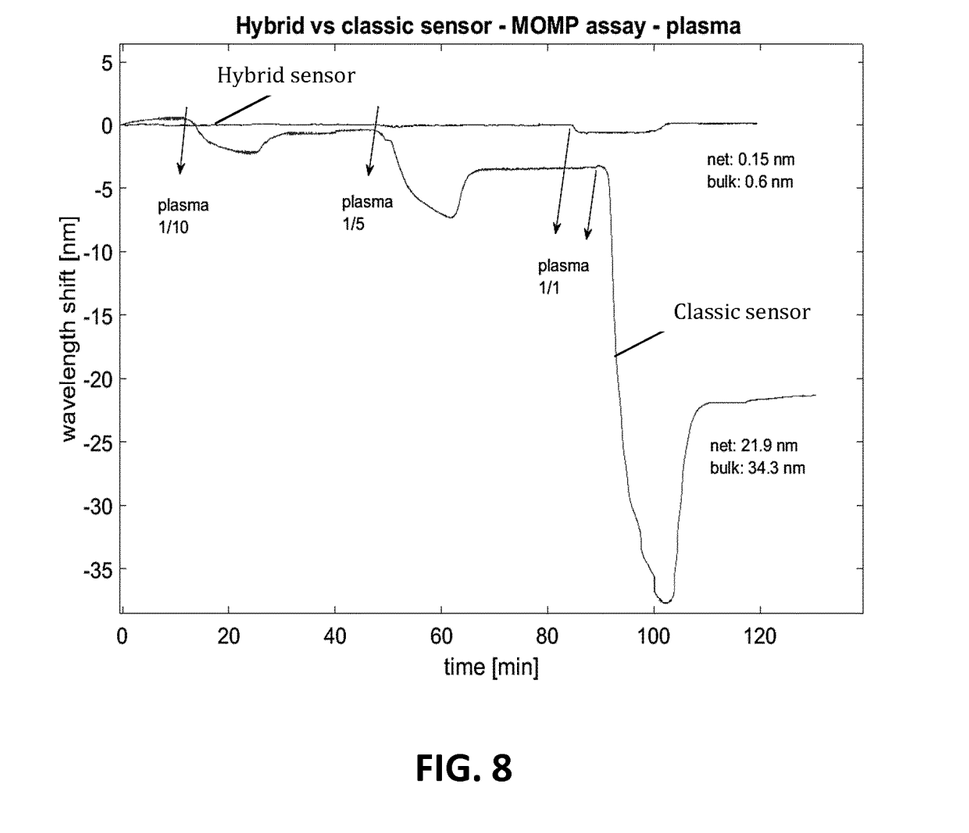
FIG. 8 illustrates a sensor response in an experiment, illustrating features and advantages of embodiments of the present invention.

FIG. 8 illustrates aspecific binding as obtained in a sensor according to an embodiment of the present invention. In FIG. 8, the results are shown for both a classic sensor and a hybrid sensor according to an embodiment of the present invention. Both sensors were functionalized via the same copolymer as described in the earlier example above, but they have been grafted with an antibody to a *Chlamydia trachomatis* major outer membrane protein (MOMP). Subsequently a sequence of plasma dilutions are flown. No specific binding could happen since the *chlamydia* bacteria was not present in the used plasma. The figure indicates the moments when the diluted plasma was flown over both chips. The experiment is started with a pulse of PBS and after every plasma dilution there is a PBS pulse as well. The classic sensor has an aspecific signal of 21.9 nm after the flow of 1× plasma, while the hybrid sensor has a reduced aspecific signal of 0.15 nm. This illustrates very well why a classic sensor has a hard time to measure anything in plasma without cleaning up the sample. This aspecific signal of 21.9 nm would obscure any binding signal (0-10 nm in size typically), even after a washing step as present in this experiment. The hybrid sensor performs very well however in plasma: the adsorption of the matrix elements in the plasma to both arms are equal for the hybrid sensor, giving rise to a heavily reduced aspecific signal since these are filtered out. The relevance of grafting a dummy antibody on the reference arm of the hybrid sensor in order to stay as close as possible to this situation, where both arms were functionalized equal, is illustrated.

The invention claimed is:

1. A sensing system for characterizing an analyte of interest in a sample, the sensing system comprising a photonic integrated circuit comprising an integrated interferometer configured for spectroscopic operation that characterizes the analyte of interest in the sample by using spectral features of a spectral transfer function of the integrated interferometer, the integrated interferometer comprising at least a sensing arm and a reference arm, both the sensing arm and the reference arm having an exposable segment configured such that light passing through the exposable segment interacts with the sample, whereby the exposable segment of the reference arm has an optical path length which is smaller than twice the optical path length of the exposable segment of the sensing arm, wherein the exposable section of the sensing arm is configured to be selective to the analyte of interest, whereas the exposable section of the reference arm is configured to be not selective to the analyte of interest, wherein one or more of the reference arm or the sensing arm comprises a covered segment configured such that light passing through the one or more covered segment(s) does not interact with the sample when the interferometer is in use, wherein an overall optical path length difference between the reference and the sensing arm is due in part to different lengths of the respective one or more covered segments of the sensing arm and the reference arm, and the overall optical path length difference is such that the spectral transfer function of the integrated interferometer has a period P not smaller than 0.5 nm and the sensing system has a spectral resolution smaller than or equal to P/2.

2. The sensing system according to claim 1, wherein a number of reference arms is exactly one and a number of sensing arms is exactly one.

3. The sensing system according to claim 1, wherein the integrated interferometer is a Mach-Zehnder interferometer.

4. The sensing system according to any of claim 1, wherein a length of the covered segment is zero for one of the sensing arm or the reference arm.

5. The sensing system according to claim 1, wherein the exposable segments that are exposed to the sample, when the sensing system is in contact with the sample, have a same surface treatment finishing, except the surface treatment finishing of the exposable segments have different active specific probes for probing the analyte of interest.

6. The sensing system according to claim 1, wherein the sensing system is configured to guide radiation in the photonic integrated circuit in waveguides, and
wherein a width of the waveguides in the covered segment in the reference arm is substantially different from a width of the covered segment in the sensing arm and wherein the width of the waveguide in the covered segment in the sensing arm and the width of the waveguide in the covered segment in the reference arm are tuned for a-thermal operation.

7. The sensing system according to claim 1, wherein the sensing system is free from active phase control elements or referencing electronics.

8. The sensing system according to claim 1 wherein the sensing system comprises a radiation system configured for providing broadband radiation and/or a detector configured for detecting broadband radiation.

9. A method comprising;
detecting and/or quantifying an analyte of interest in a sample using a sensing system, wherein
the sensing system comprises a photonic integrated circuit comprising an integrated interferometer configured for spectroscopic operation that characterizes the analyte of interest in the sample by using spectral features of a spectral transfer function of the integrated interferometer, the integrated interferometer comprising at least a sensing arm and a reference arm, both the sensing arm and the reference arm having an exposable segment configured such that light passing through the exposable segment interacts with the sample, whereby the exposable segment of the reference arm has an optical path length which is smaller than twice the optical path length of the exposable segment of the sensing arm, wherein the exposable section of the sensing arm is configured to be selective to the analyte of interest, whereas the exposable section of the reference arm is configured to be not selective to the analyte of interest, wherein one or more of the reference arm or the sensing arm comprises a covered segment configured such that light passing through the one or more covered segments does not interact with the sample when the interferometer is in use, wherein an overall optical path length difference between the reference and the sensing arm is due in part to different lengths of the respective one or more covered segments of the sensing arm and the reference arm, and the overall optical path length difference is such that the spectral transfer function of the integrated interferometer has a period P not smaller than 0.5 nm and the sensing system has a spectral resolution smaller than or equal to P/2.

\* \* \* \* \*